(12) United States Patent
Dobbins et al.

(10) Patent No.: US 8,336,657 B2
(45) Date of Patent: Dec. 25, 2012

(54) SUPPORT STRUCTURE FOR INVERTER SYSTEM CONTROLLER MODULE

(75) Inventors: Brandon G. Dobbins, Grosse Pointe Shores, MI (US); Edgar Edward Donabedian, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 463 days.

(21) Appl. No.: 12/705,005

(22) Filed: Feb. 12, 2010

(65) Prior Publication Data
US 2011/0162902 A1 Jul. 7, 2011

(51) Int. Cl.
*B60R 16/04* (2006.01)
(52) U.S. Cl. ........................ 180/68.5; 280/274
(58) Field of Classification Search .......... 180/68.5, 180/65.21, 312, 274; 903/951; 280/274; 296/187.03, 187.05, 187.08, 187.11
See application file for complete search history.

(56) References Cited

U.S. PATENT DOCUMENTS

| | | | |
|---|---|---|---|
| 7,051,825 B2 | 5/2006 | Masui et al. | |
| 7,503,585 B2 * | 3/2009 | Hashimura et al. | 280/782 |
| 7,717,207 B2 * | 5/2010 | Watanabe et al. | 180/68.5 |
| 8,051,934 B2 * | 11/2011 | Kiya et al. | 180/68.5 |
| 2002/0157886 A1 * | 10/2002 | Iwase | 180/68.5 |
| 2006/0121795 A1 * | 6/2006 | Hashimura et al. | 439/681 |
| 2007/0215399 A1 * | 9/2007 | Watanabe et al. | 180/68.5 |
| 2008/0078597 A1 * | 4/2008 | Voigt et al. | 180/68.5 |
| 2008/0315572 A1 * | 12/2008 | Hashimura et al. | 280/782 |
| 2009/0213564 A1 * | 8/2009 | Kakuda et al. | 361/811 |
| 2009/0226806 A1 * | 9/2009 | Kiya | 429/186 |
| 2010/0170736 A1 * | 7/2010 | Watanabe et al. | 180/68.5 |
| 2011/0032676 A1 * | 2/2011 | Matsuo et al. | 361/703 |
| 2011/0162902 A1 * | 7/2011 | Dobbins et al. | 180/68.5 |
| 2011/0284298 A1 * | 11/2011 | Ajisaka | 180/65.21 |
| 2012/0097466 A1 * | 4/2012 | Usami et al. | 180/68.5 |

FOREIGN PATENT DOCUMENTS

JP 2009051242 A 3/2009

OTHER PUBLICATIONS

Toyota Prius, MY 2010, Ford Benchmarking Study, Sep. 2009.
Toyota Camry, MY 2008, Ford Benchmarking Study, Jan. 2008.
Toyota Harrier, MY 2007, Ford Benchmarking Study, Jan. 2007.
Toyota Highlander, MY 2007, Ford Benchmarking Study, Jan. 2007.

* cited by examiner

*Primary Examiner* — John Walters
*Assistant Examiner* — James Triggs
(74) *Attorney, Agent, or Firm* — David B. Kelley; Brooks Kushman P.C.

(57) ABSTRACT

A hybrid-electric vehicle has an engine compartment defined by a transverse rail extending generally parallel to a lateral axis of the vehicle, first and second side rails extending forwardly from the transverse rail, and a hood extending over the engine compartment. A hybrid-electric transmission is located in the engine compartment and an inverter system controller module (ISCM) is supported on an equipment shelf extending between the hybrid electric transmission and the hood. The equipment shelf includes an inclined portion attached to the transverse rail and extending upwardly and forwardly at an oblique angle; a generally horizontal tray projecting forwardly from the inclined portion above the hybrid electric transmission; and a lateral brace extending from a forward end of the tray laterally to the first side rail. The junction between the inclined portion and the tray forms a deformation trigger that absorbs crash loads.

17 Claims, 4 Drawing Sheets

SUPPORT STRUCTURE FOR INVERTER SYSTEM CONTROLLER MODULE

BACKGROUND

1. Technical Field

The present invention relates generally to hybrid electric vehicles having an inverter system controller module as part of their powertrain, and more specifically to a structure for supporting an inverter system controller module in an engine compartment.

2. Background Art

As automakers attempt to increase the numbers of vehicles having an electric and hybrid electric powertrain, some effort has been made to retrofit such an electric or hybrid powertrain into an existing vehicle platform that was originally designed around a conventional internal combustion engine. To avoid manufacturing complexity and associated increases in weight and cost, vehicle manufacturers will usually attempt to implement a platform-sharing strategy wherein a maximum practical amount of the original, conventionally powered vehicle is carried-over into the electric/hybrid version of a vehicle. Packaging of a electric/hybrid vehicle powertrain in a vehicle platform originally designed for an internal combustion engine is challenging because of the differences in size and required configuration of the powertrain components.

Several types of electric/hybrid powertrains include an inverter system controller module (ISCM) which converts high voltage DC power stored in the battery into high voltage AC power used by the electric machines in the electric/hybrid transmission. The ISCM is typically slightly larger than a conventional 14-volt automotive battery and typically weighs approximately 20 kg. In some systems, the ISCM is attached directly to the hybrid transmission housing and the combined unit is mounted in the engine compartment. For flexibility in packaging as well as for other reasons, it may be advantageous to separate the ISCM from the hybrid transmission. Such a decoupling presents the challenge of having to support the independent ISCM in an already limited space package environment within the engine compartment of a carryover body structure, and to do so without compromising safety, durability, NVH, and at an efficient cost and weight.

SUMMARY

According to the disclosed embodiments of the present invention, a frame for a motor vehicle comprises a transverse rail extending generally parallel to a lateral axis of the vehicle, a side rail extending forwardly and generally parallel to a longitudinal axis of the vehicle, and an equipment shelf. The equipment shelf comprises an inclined portion attached to the transverse rail and extending upwardly and forwardly at an oblique angle, a generally horizontal tray forward of an upper end of the inclined portion, and a lateral brace connected to a forward end of the tray and extending generally laterally to meet the side rail. The disclosed frame geometry allows an inverter system controller module (ISCM) to be supported above a hybrid electric transmission while using structural components in the engine compartment that are carried over from a non-hybrid version of a vehicle platform.

In an example of structural components carried over from a non-hybrid version of the vehicle, a battery mounting tray attached to the side rail may be used to support an outboard end of the lateral brace.

According to a further aspect of the disclosed embodiment, a junction between the inclined portion and the tray comprises a deformation trigger designed to yield in the event of a forward collision event. By properly designing the deformation trigger, the equipment shelf may absorb the kinetic energy caused by rearward movement of the ISCM during a crash.

According to another aspect of the disclosed embodiments, a vehicle has a hybrid-electric powertrain comprising a hybrid-electric transmission disposed in an engine compartment defined by a transverse rail extending generally parallel to a lateral axis of the vehicle, first and second side rails extending forwardly from the transverse rail and generally parallel to a longitudinal axis of the vehicle, and a hood extending over and defining an upper boundary of the engine compartment. An ISCM is located between the hybrid electric transmission and the hood and is supported by a an equipment shelf comprising: an inclined portion attached to the transverse rail and extending upwardly and forwardly at an oblique angle; a generally horizontal tray attached to and projecting forwardly from the inclined portion and disposed above the hybrid electric transmission, the junction between the inclined portion and the tray comprising a deformation trigger; and a lateral brace connected to a forward end of the tray, extending generally laterally to the first side rail, and attached to the first side rail.

Other features and advantages of the present invention will be readily appreciated, as the same becomes better understood after reading the subsequent description taken in conjunction with the accompanying drawings.

BRIEF DESCRIPTION OF THE DRAWINGS

Embodiments of the present invention will now be described by way of example only with reference to the accompanying drawings in which.

DETAILED DESCRIPTION

Figure 1:
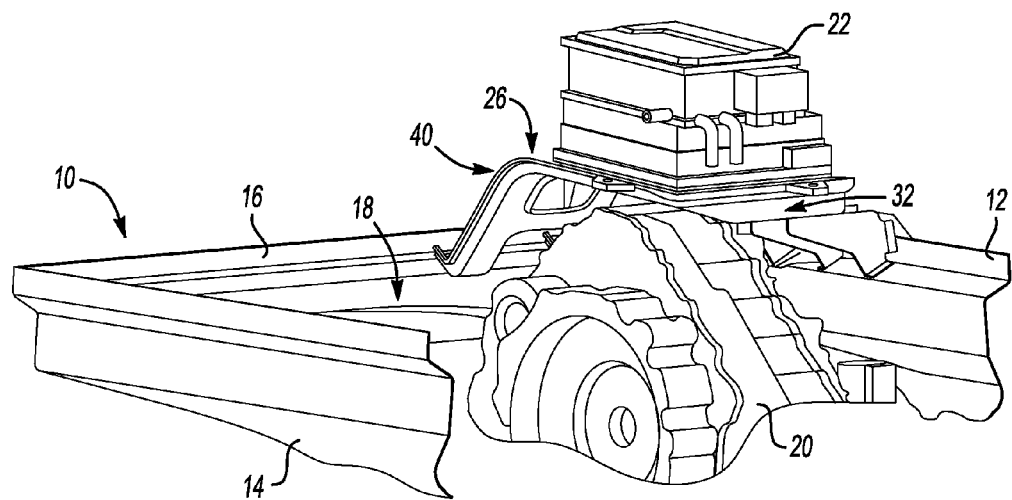
FIG. 1 is a partial perspective view of a vehicle frame and powertrain components according to an embodiment of the invention.

Referring to FIG. 1, a frame of an automotive vehicle is generally indicated at 10 and includes a left side rail 12, a right side rail 14, and a transverse rail 16. Left side rail 12, right side rail 14, and transverse rail 16 are connected with one another by welding, bolts, and/or other appropriate fastening methods well known in the automotive vehicle art, and define an engine compartment 18. The forward boundary of engine compartment 18 is not shown, but may comprise a bumper beam and/or other structure attached to the forward ends of side rails 12, 14.

Frame 10 and engine compartment 18 are of general configuration used in an automotive vehicle that was originally designed to include a conventional internal combustion engine (not shown) and has been converted to allow installation of a hybrid electric powertrain.

Figure 3:
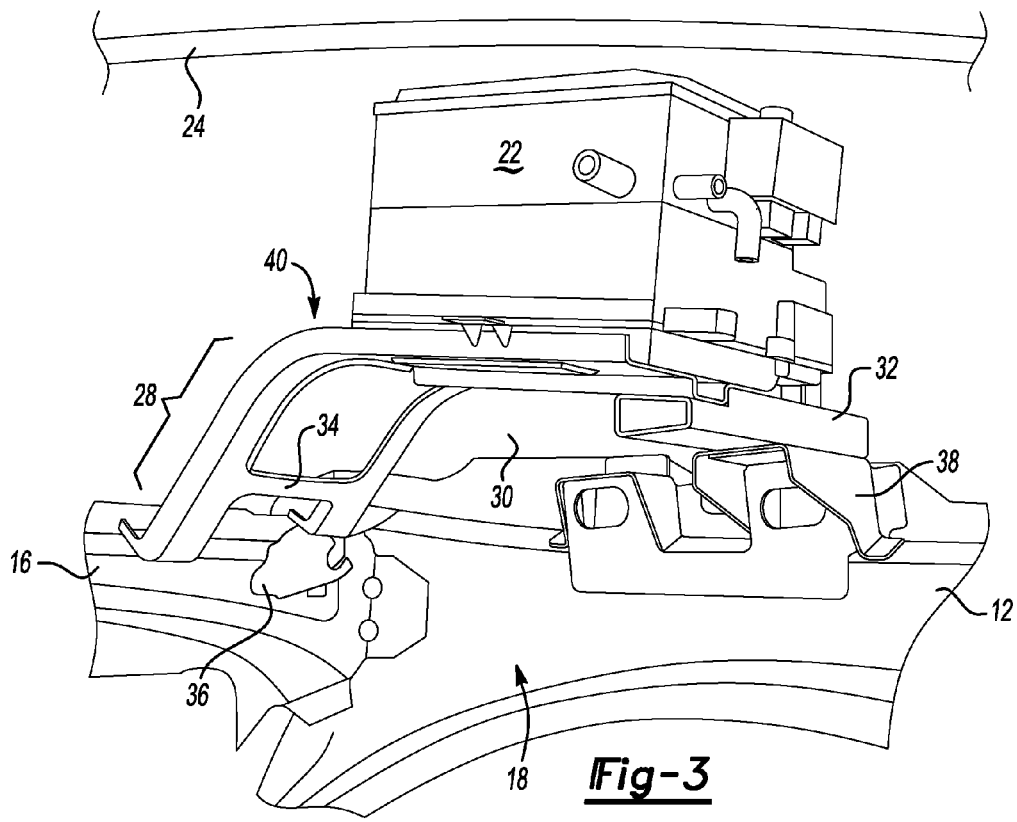
FIG. 3 is another partial perspective view of the vehicle frame and powertrain components of the preceding figures.

A hybrid electric transmission (HET) 20 and an inverter system controller module (ISCM) 22 are located in engine compartment 18. While HET 20 is omitted from several of the view for clarity, it may be seen in FIG. 1 that an ISCM shelf 26 extends over HET 20 and supports ISCM 22. As best seen in FIG. 3, a hood 24 extends over and defines an upper boundary of engine compartment 18.

Figure 4:
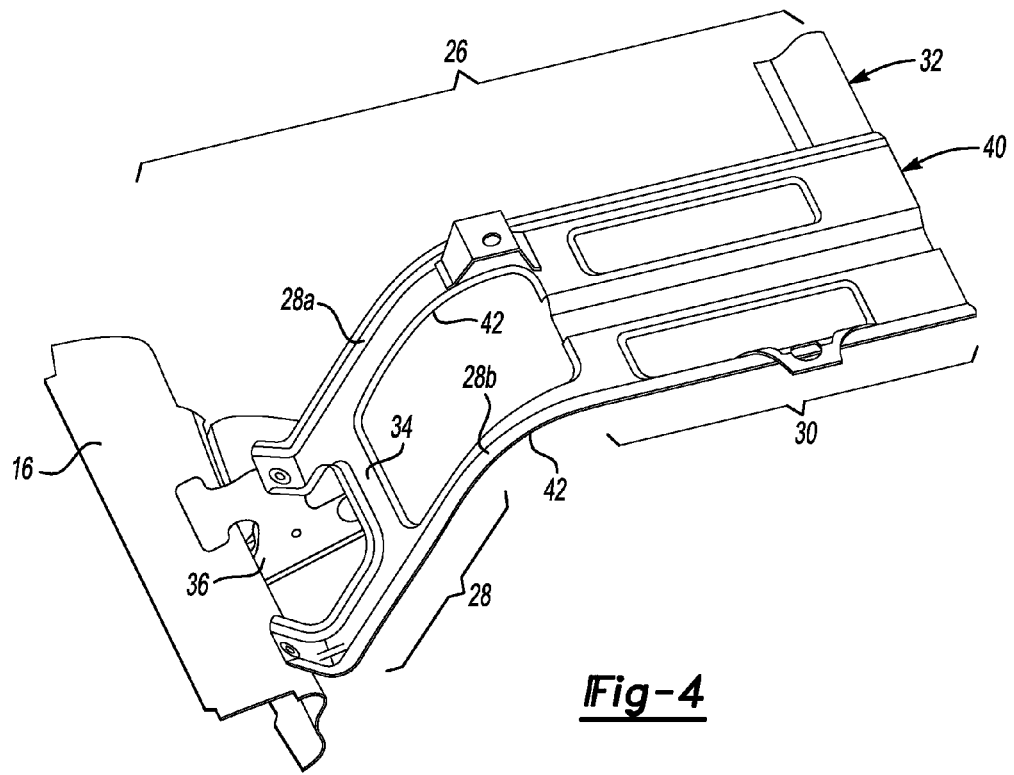
FIG. 4 is a view of the ISCM shelf according to an embodiment of the invention.

As best seen in FIG. 4, ISCM shelf 26 is composed of two main parts: An arch bracket 40 attached to transverse rail 16 and extending upwardly and forwardly over HET 20, and a lateral brace 32 attached to arch bracket 40 adjacent its forward end and extending to left side rail 12. Arch bracket 40 is comprised of an inclined portion 28 and a tray 30 projecting forwardly from the inclined portion to be disposed generally horizontally above the HET 20. Inclined portion 28 comprises a pair of legs 28a, 28b connected by a crossbar 34. Lower ends of legs 28a, 28b are individually connected to transverse rail 16, for example by welding or threaded fasteners. In the embodiment shown in FIGS. 2-4, the left leg 28a is bolted to a connection bracket 36 which is in turn welded to transverse rail 16, while right leg 28b is bolted or welded directly to the transverse rail.

Lateral brace 32 may be fastened to tray 30 by any appropriate means, such as welding and/or threaded fasteners. The outboard end of lateral brace 32 is attached to left side rail 12 via a support bracket 38. Support bracket 38 may be a structural feature carried over from a non-hybrid version of the vehicle. In the embodiment illustrated, support bracket 38 is of the same configuration as a bracket used to support a low-voltage battery tray (not shown) used in the non-hybrid version of the vehicle platform. In the hybrid-powered version of the vehicle platform, the low-voltage battery has been moved to another location in the vehicle, making support bracket 38 available for other purposes. Similarly, connection bracket 36, to which left leg 28a is bolted, may be a component previously used to support a battery tray or similar component in a non-hybrid version of the vehicle platform. Utilizing components such as support bracket 38 and connection bracket 36 that are carried over from a non-hybrid version of the platform is an efficient use of both engineering and manufacturing resources.

The portion of arch bracket 40 where inclined portion 28 and tray portion 30 meet comprises a curved deformation trigger 42. As used in this context, a deformation trigger is broadly defined as a structural feature that is specifically designed or engineered to plastically deform in a known and predictable manner during a collision between the vehicle and another object in order to absorb kinetic energy. In the present case, deformation triggers 42 are located at the upper forward ends of both legs 28a, 28b adjacent to where the legs meet tray portion 30. The design of legs 28a, 28b (including the geometry and material types) relative to adjacent portions of the vehicle structure, allows rearward motion of the relatively heavy ISCM 22 to be controlled and the dynamic forces absorbed by plastic deformation of the arch bracket 40.

Figure 2:
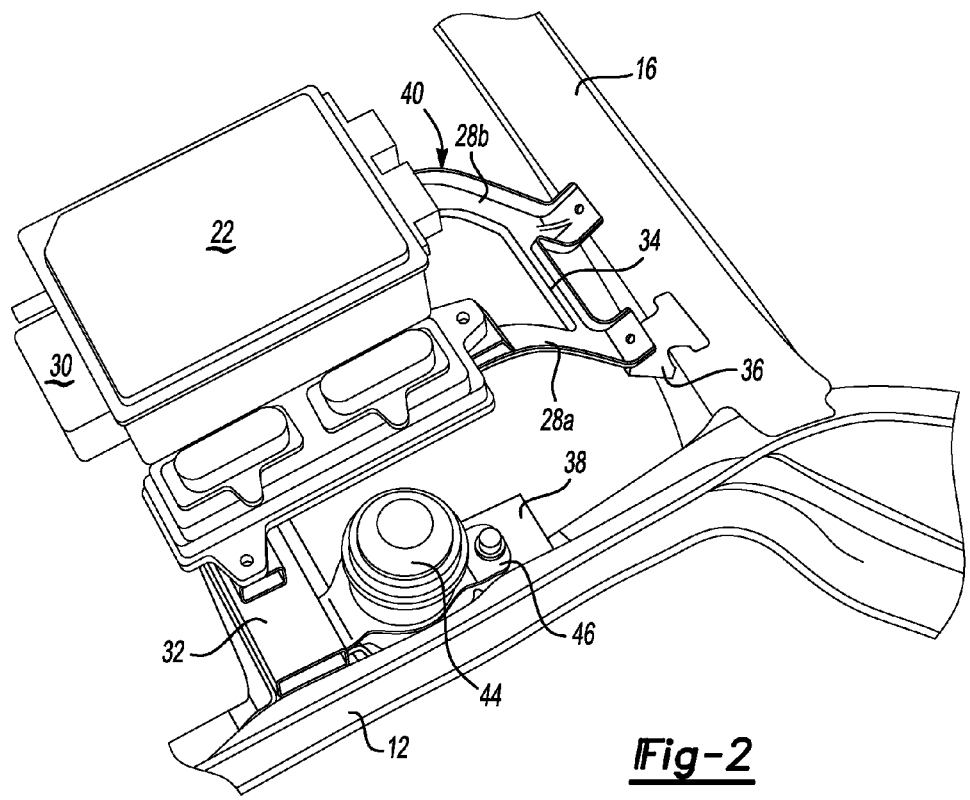
FIG. 2 is another partial perspective view of the vehicle frame and powertrain components of FIG. 1.
Figure 5:
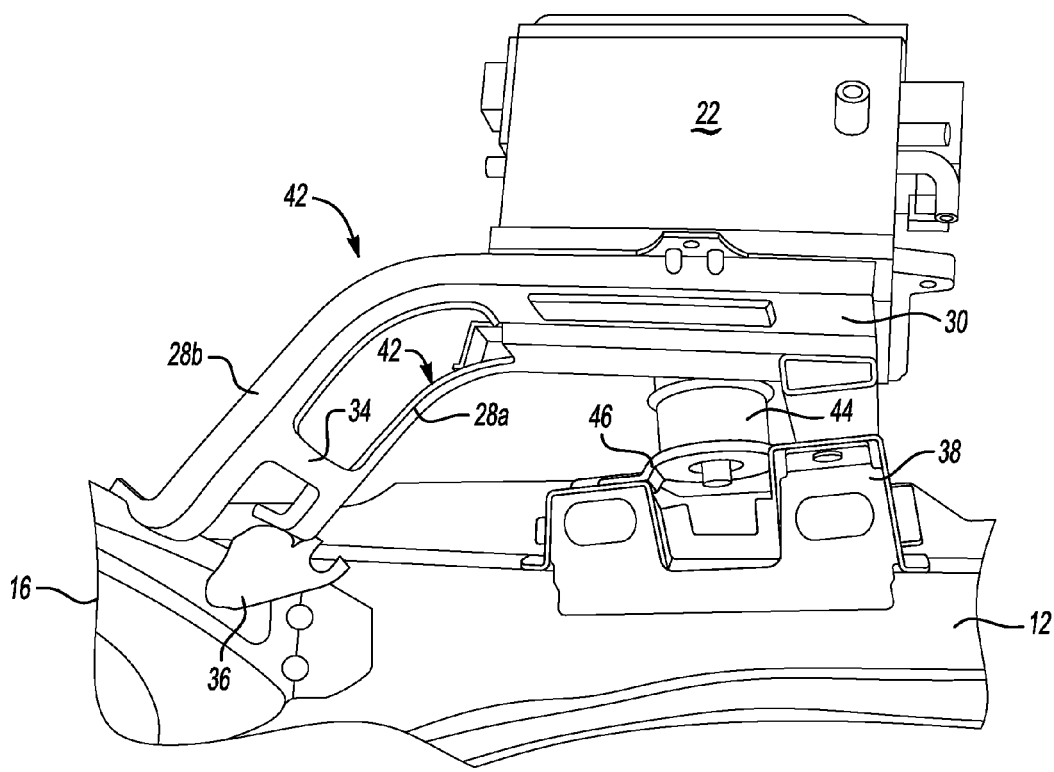
FIG. 5 is another partial perspective view of the vehicle frame and powertrain components of the preceding figures.

As may be seen in FIGS. 2 and 5, support bracket 38 may also serve as an attachment point for a transmission mount 44. Transmission mount is not shown in some views for clarity. Transmission mount 44 may be a fluid and/or visco-elastic mount and is connected to support bracket 38 by a mounting plate 46 using bolts or other appropriate means. Transmission mount 44 is connected to transmission 20 and supports the outboard or leftmost end of the transmission.

As best seen in FIG. 2, ISCM shelf 26 positions ISCM 22 directly above and close to the upper limit of transmission 20 with a minimum amount of clearance between the bottom of tray 30 and the transmission 20. Likewise, there is a minimum amount of clearance between the top of ISCM 22 and the lower surface of hood 24, as best seen in FIG. 3.

Figure 6:
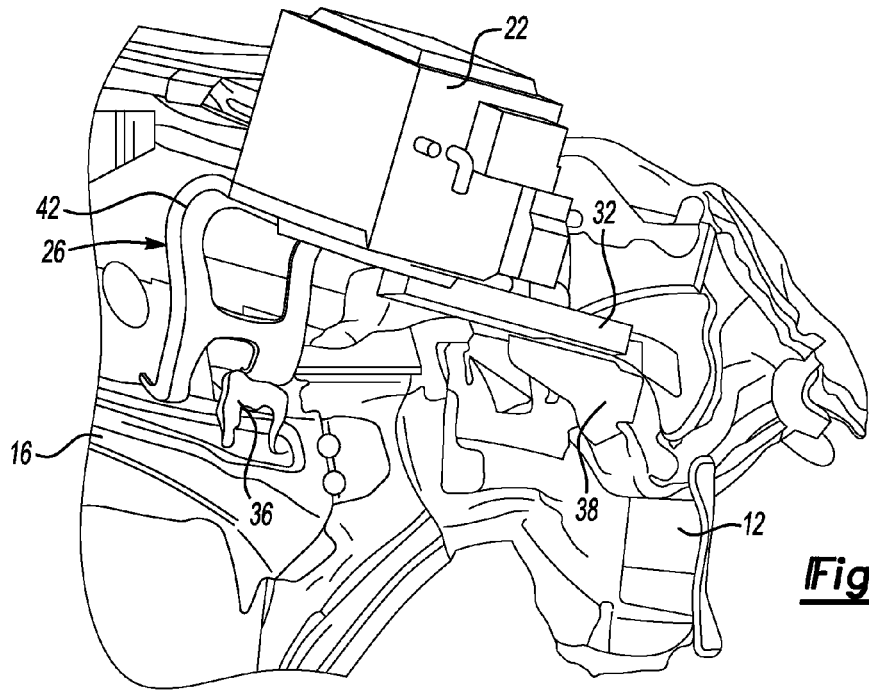
FIG. 6 is a conceptual view of the vehicle frame and powertrain components of the preceding figures after a frontal impact.

An example of engineered deformation of deformation triggers 42 during a forward collision with another object (not shown) is illustrated in FIG. 6, in which ISCM 22 has been forced rearward resulting in the arch bracket 40 buckling at the locations of deformation triggers 42. Additionally, arch bracket 40 has deformed adjacent the lower ends of legs 28a, 28b. An advantage of the deformation of arch bracket 40 is that the forces generated by movement of ISCM 22 are almost fully absorbed by the arch bracket rather than being transferred to transverse rail 16, so that no additional reinforcement of transverse rail 16 or other nearby structure is required when a vehicle platform is redesigned to accept an HEV powertrain.

Figure 7:
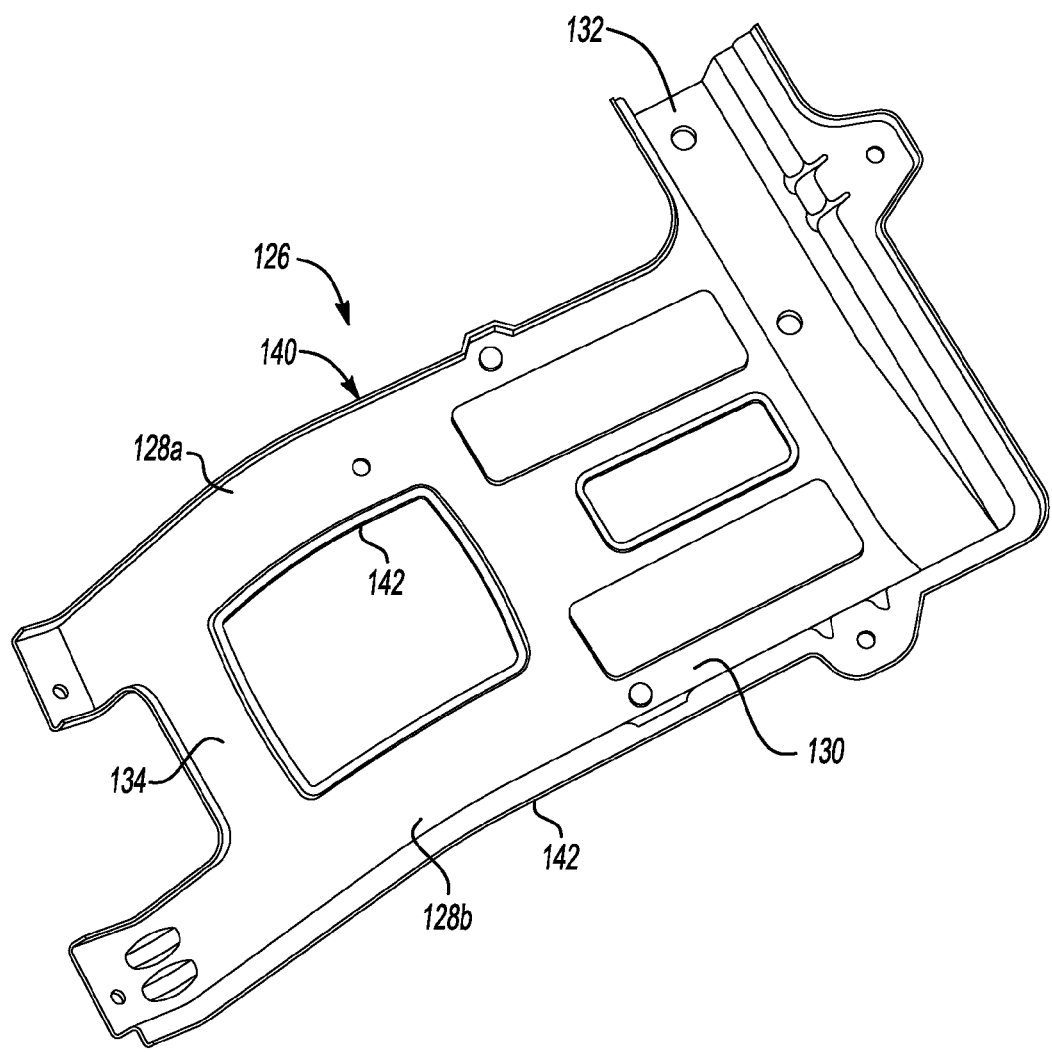
FIG. 7 is a perspective view of a one-piece ISCM shelf.

FIG. 7 illustrates of an ISCM shelf 126 according to an alternative embodiment the invention. ISCM shelf 126 is an integral, one-piece unit which may be economically formed, for example, by stamping a blank of sheet metal. The one-piece shelf 126 generally includes an arch bracket portion 140 and a lateral brace portion 132. Arch bracket portion 140 is comprised of a tray portion 130 and a pair of inclined legs 128a, 128b connected by a crossbar portion 134. Inclined legs 128a, 128b include curved deformation triggers 142 at the locations where they meet tray portion 130.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A frame for a motor vehicle comprising:
   a transverse rail extending generally parallel to a lateral axis of the vehicle;
   a side rail extending forwardly and generally parallel to a longitudinal axis of the vehicle; and
   an equipment shelf comprising an inclined portion attached to the transverse rail and extending upwardly and forwardly at an oblique angle, a generally horizontal tray forward of an upper end of the inclined portion, and a lateral brace connected to a forward end of the tray and extending generally laterally to meet the side rail, a junction between the inclined portion and the tray comprising a curved transition therebetween to form a deformation trigger designed to yield in the event of a forward collision event.

2. The apparatus according to claim 1 further comprising a battery mounting bracket between the lateral brace and the side rail.

3. A vehicle comprising:
   a first side rail and a second side rail spaced apart from one another and extending generally parallel to a longitudinal axis of the vehicle;
   a transverse rail extending between and attached to the first and second side rails, the first and second side rails and the transverse rail defining an engine compartment;

a hood extending over and defining an upper boundary of the engine compartment;

a hybrid-electric transmission disposed in the engine compartment;

an equipment shelf comprising an inclined portion attached to the transverse rail and extending upwardly and into the engine compartment at an oblique angle, a tray attached to and projecting forwardly from the inclined portion and disposed generally horizontally above the hybrid electric transmission, and a lateral brace having an inboard end attached to a forward end of the tray and an outboard end attached to the first side rail; and an inverter system controller module supported on an upper surface of the equipment shelf.

4. The apparatus according to claim 3 wherein the lateral brace is attached to the first side rail by a support bracket fixed to the first side rail, and a transmission mount for the hybrid electric transmission is also attached to the support bracket.

5. The apparatus according to claim 3 wherein a junction between the inclined portion and the tray comprises a deformation trigger designed to yield in the event of a forward collision event.

6. The apparatus according to claim 5 wherein the deformation trigger comprises a curved transition between the inclined portion and the tray.

7. The apparatus according to claim 3 wherein the equipment shelf inclined portion comprises two generally parallel legs, each leg being separately attached to the transverse rail.

8. The apparatus according to claim 7 wherein at least one of the legs is bolted to a connection bracket that is welded to the transverse rail.

9. The apparatus according to claim 7 wherein a cross bar extends laterally between the legs adjacent to the transverse rail.

10. A vehicle having a hybrid electric powertrain comprising:

a hybrid-electric transmission disposed in an engine compartment defined by a transverse rail extending generally parallel to a lateral axis of the vehicle, first and second side rails extending forwardly from the transverse rail and generally parallel to a longitudinal axis of the vehicle, and a hood extending over and defining an upper boundary of the engine compartment; and an inverter system controller module located between the hybrid electric transmission and the hood, the inverter system controller module supported by a an equipment shelf comprising:

an inclined portion attached to the transverse rail and extending upwardly and forwardly at an oblique angle;

a generally horizontal tray attached to and projecting forwardly from the inclined portion and disposed above the hybrid electric transmission, the junction between the inclined portion and the tray comprising a deformation trigger; and a lateral brace connected to a forward end of the tray, extending generally laterally to the first side rail, and attached to the first side rail.

11. The apparatus according to claim 10 wherein the deformation trigger comprises a curved transition between the inclined portion and the tray.

12. The apparatus according to claim 10 further comprising a support bracket connecting the lateral brace and the first side rail, the support bracket further supporting a transmission mount for the hybrid electric transmission.

13. The apparatus according to claim 10 wherein the equipment shelf inclined portion comprises two generally parallel legs, each leg being separately attached to the transverse rail.

14. The apparatus according to claim 13 wherein at least one of the legs is bolted to a connection bracket that is welded to the transverse rail.

15. The apparatus according to claim 13 wherein a cross bar extends laterally between the legs adjacent to the transverse rail.

16. A frame for a motor vehicle comprising:

a transverse rail extending generally parallel to a lateral axis of the vehicle;

a side rail extending forwardly and generally parallel to a longitudinal axis of the vehicle; and an equipment shelf comprising an inclined portion attached to the transverse rail and extending upwardly and forwardly at an oblique angle, a generally horizontal tray forward of an upper end of the inclined portion, and a lateral brace connected to a forward end of the tray and extending generally laterally to meet the side rail, wherein the inclined portion comprises two generally parallel legs, each leg being separately attached to the transverse rail and at least one of the legs being bolted to a connection bracket that is welded to the transverse rail.

17. A frame for a motor vehicle comprising:

a transverse rail extending generally parallel to a lateral axis of the vehicle;

a side rail extending forwardly and generally parallel to a longitudinal axis of the vehicle; and an equipment shelf comprising an inclined portion attached to the transverse rail and extending upwardly and forwardly at an oblique angle, a generally horizontal tray forward of an upper end of the inclined portion, and a lateral brace connected to a forward end of the tray and extending generally laterally to meet the side rail, wherein the inclined portion comprises two generally parallel legs, each of the legs being separately attached to the transverse rail and a cross bar extending laterally between the legs adjacent to the transverse rail.

* * * * *